Patented Nov. 3, 1942

2,300,678

UNITED STATES PATENT OFFICE 2,300,678

N,N'-DIMETHYLENE-4,4'-DIAMINODIPHENYL SULPHONE

Morris S. Kharasch and Otto Reinmuth, Chicago, Ill., assignors to Eli Lilly and Company, Indianapolis, Ind., a corporation of Indiana No Drawing. Application June 3, 1940, Serial No. 338,659

4 Claims. (Cl. 260—397.6)

Our invention relates to N,N'-dimethylene-4,4'-diaminodiphenyl sulphone, a new derivative of 4,4'-diaminodophenyl sulphone; and to the process of producing it.

This new product is of especial advantage as an intermediate in preparing certain new chemotherapeutic products which are the subjects of other co-pending applications.

The present application is a continuation in part of our co-pending application Serial No. 305,926, filed November 24, 1939.

The new compound, N,N'-dimethylene-4,4'-diaminodiphenyl sulphone, has the following formula:

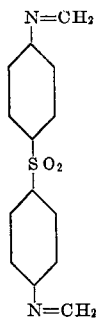

It is obtained in excellent yield by treating 4,4'-diaminodiphenyl sulphone, suspended (with some solution) in alcohol, with slightly more than two molecular equivalents of formaldehyde solution (formalin) for each amino group; four to six moles of formaldehyde are used in our preferred procedure. Care must be taken to avoid the introduction of either acids or strong bases. The mixture is heated until a clear solution is obtained. Upon standing and chilling, the N,N'-dimethylene-4,4'-diaminodiphenyl sulphone crystallizes. It is sparingly soluble in cold alcohol and in acetone. The compound has no melting point. Upon heating it decomposes in the neighborhood of 260° C. It readily condenses with mercapto acids to produce condensation products which yield water-soluble salts.

The structure as indicated by the formula shows N,N'-dimethylene-4,4'-diaminodiphenyl sulphone without any methylol group in the benzene nucleus. It is known that when a primary amine is treated with formaldehyde some of the formaldehyde tends to condense with the aromatic ring to yield a methylol derivative. It is therefore possible that the products resulting from the practice of the method described contain some of the methylol groups in the benzene ring. The precise amount of the methylol compounds in the reaction products resulting from the practice of the method described has not been ascertained.

We claim as our invention:

1. The new compound N,N'-dimethylene-4,4'-diaminodiphenyl sulphone, which has the following formula:

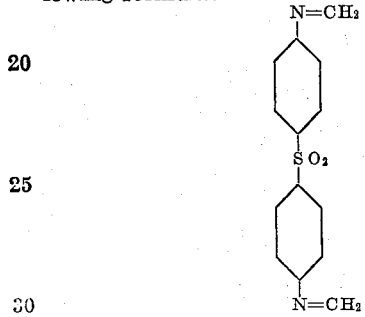

2. The process of preparing N,N'-dimethylene-4,4'-diaminodiphenyl sulphone, which consists in reacting 4,4'-diaminodiphenyl sulphone suspended in alcohol, with formaldehyde.

3. The process of preparing a reaction product which consists in reacting 4,4'-diaminodiphenyl sulphone with formaldehyde.

4. The process of preparing a reaction product which consists in reacting 4,4'-diaminodiphenyl sulphone with two molecular equivalents of formaldehyde for each amino group in the 4,4'-diaminodiphenyl sulphone.

MORRIS S. KHARASCH.
OTTO REINMUTH.